US006245438B1

(12) United States Patent
Dupre et al.

(10) Patent No.: US 6,245,438 B1
(45) Date of Patent: Jun. 12, 2001

(54) CYCLIC UREA-FORMALDEHYDE PREPOLYMER FOR USE IN PHENOL-FORMALDEHYDE AND MELAMINE-FORMALDEHYDE RESIN-BASED BINDERS

(75) Inventors: F. C. Dupre, Atlanta; Millard E. Foucht, Stone Mountain; William P. Freese, Conyers; Kurt D. Gabrielson, Liburn; Benjamin D. Gapud, Lawrenceville; W. Hayes Ingram, Conyers; Ted M. McVay, Lawrenceville; Richard A. Rediger; Kelly A. Shoemake, both of Conyers; Kim K. Tutin, Stone Mountain; James T. Wright, Decatur, all of GA (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 61 days.

(21) Appl. No.: 09/598,894

(22) Filed: Jun. 22, 2000

Related U.S. Application Data

(62) Division of application No. 09/215,742, filed on Dec. 17, 1998, now Pat. No. 6,114,491.
(60) Provisional application No. 60/095,249, filed on Aug. 4, 1998, and provisional application No. 60/068,286, filed on Dec. 19, 1997.

(51) Int. Cl.[7] .................. B32B 23/08; C08G 14/04; C08G 8/10; C08G 8/28
(52) U.S. Cl. .................. 428/511; 428/502; 428/565; 428/566; 525/484; 528/129; 528/254
(58) Field of Search .................. 428/528, 511, 428/502, 505, 506; 525/484; 528/129, 254

(56) References Cited

U.S. PATENT DOCUMENTS

| 1,678,024 | 7/1928 | Terwilliger. |
|---|---|---|
| 2,641,584 | 6/1953 | Martone, Jr.. |
| 2,931,738 | 5/1960 | Stalego. |
| 3,002,857 | 10/1961 | Stalego. |
| 3,253,948 | 5/1966 | Tiede. |
| 3,716,395 | 2/1973 | Bauer et al.. |
| 3,856,562 | 12/1974 | White et al.. |
| 3,945,962 | 3/1976 | Clark. |
| 4,244,990 | 1/1981 | Mayerhoffer. |
| 4,285,848 | 8/1981 | Hickson. |
| 4,473,613 | 9/1984 | Jaisle et al.. |
| 4,499,125 | 2/1985 | Blasing et al.. |
| 4,710,406 | 12/1987 | Fugier et al.. |
| 4,713,299 | 12/1987 | Taylor et al.. |
| 4,778,510 | 10/1988 | Hawkins. |
| 5,008,365 | 4/1991 | Druet et al.. |
| 5,032,431 | 7/1991 | Conner et al.. |
| 5,086,089 | 2/1992 | Shu. |
| 5,270,434 | 12/1993 | Tetart et al.. |
| 5,300,562 | 4/1994 | Coventry et al.. |
| 5,306,783 | 4/1994 | Kirchgaessner et al.. |
| 5,330,846 | 7/1994 | Eisele et al.. |
| 5,362,842 | 11/1994 | Graves et al.. |
| 5,473,012 | 12/1995 | Coventry et al.. |
| 5,478,656 | 12/1995 | Flory et al.. |
| 5,534,612 | 7/1996 | Taylor et al.. |
| 5,623,032 | 4/1997 | Wu. |
| 5,674,971 | 10/1997 | Graves. |
| 5,753,871 | 5/1998 | Kahara et al.. |
| 5,763,558 | 6/1998 | Chauvin et al.. |

FOREIGN PATENT DOCUMENTS

| 912721 | 10/1972 | (CA). |
|---|---|---|
| 7-118355 | 5/1995 | (JP). |
| 8-109309 | 4/1996 | (JP). |

*Primary Examiner*—Duc Truong
(74) *Attorney, Agent, or Firm*—Banner & Witcoff, Ltd.

(57) ABSTRACT

The preparation of phenol-formaldehyde and melamine-formaldehyde resin-based binders extended with a cyclic urea-formaldehyde prepolymer and to products prepared using the binders. More particularly, the invention relates to a cyclic urea prepolymer comprising urea, formaldehyde, and ammonia or a primary amine which, when added to a phenol-formaldehyde or melamine-formaldehyde based resin, results in a useful binder for the manufacturer numerous articles.

4 Claims, No Drawings

CYCLIC UREA-FORMALDEHYDE PREPOLYMER FOR USE IN PHENOL-FORMALDEHYDE AND MELAMINE-FORMALDEHYDE RESIN-BASED BINDERS

This application is a divisional of Ser. No. 09/215,742, filed Dec. 17, 1998 now U.S. Pat. No. 6,114,491 which is a continuation-in-part application of prior U.S. Provisional Patent Application Ser. Nos. 60/095,249, filed Aug. 4, 1998 and 60/068,286, filed Dec. 19, 1997.

BACKGROUND OF THE INVENTION

1. Field of the Invention

This invention relates to the preparation of phenol-formaldehyde and melamine-formaldehyde resin-based binders modified with a urea-formaldehyde polymer containing at least 20% triazone and substituted triazone compounds (cyclic urea prepolymer) and to products prepared using the binders. More particularly, the invention relates to a prepolymer comprising urea, formaldehyde, and ammonia or a primary amine which, when added to a base resin, results in a useful binder or adhesive for the manufacture of numerous articles.

2. Description of Related Art

Phenol-formaldehyde resins and melamine-formaldehyde resins are standard resins used for many products. The choice of resin depends on the desired properties. Phenol-formaldehyde resins are strong and durable and relatively inexpensive, but are generally colored resins. Melamine resins are water clear but are more expensive. Hence they are generally used only for products whereby the color or pattern of the substrate is maintained with a transparent melamine protective coating or binder.

Phenol-formaldehyde Resins

Phenol-formaldehyde resins are used to make a variety of products including consolidated wood products such as plywood, engineered lumber, hard board, fiber board, oriented strand board, and other products such as fiberglass insulation, laminates, abrasive coatings, friction binders, foams, foundry binders, and petroleum recovery binders. They are also used as paper saturating resins for oil filters, overlay, paint roller tubes and the like.

Insulation

Insulation is generally prepared by coating glass fibers or mineral wool fibers with an aqueous binder solution, usually by spraying, and passing the coated fibers through an oven where they are compressed to the desired thickness and density, and then permanently fixed by heat setting or curing the resin binder. The traditional binders used in manufacturing insulation are low molecular weight, alkaline catalyzed phenol-formaldehyde resins fortified with formaldehyde scavengers, acid catalysts, and coupling agents. Acid cure has been favored in the art because it produces a glass fiber insulation having good strength and moisture resistance characteristics.

It is often desirable to scavenge the free formaldehyde prior to application. This is done for several reasons: 1) to reduce the free formaldehyde emissions during the forming and curing of the insulation product, 2) to reduce the free formaldehyde prior to the addition of an acid catalyst, 3) to reduce the cost of the binder, and 4) to improve the anti-punk properties of the resin.

The most common scavengers are chemical species containing a primary or secondary amine functionality. Urea, ammonia, melamine, and dicyandiamide are a few of the more commonly used amines. The most common, and the most economical, amine species is urea. When urea is used as the formaldehyde scavenger, the amount of urea added to the resin is referred to as the extension level which is reported as a percent of the binder solids. Binder solids consist of phenol-formaldehyde resin solids and extender solids.

The addition of formaldehyde scavengers to a phenol-formaldehyde resin requires a finite period of time to achieve equilibrium with the free formaldehyde in the resin. The process of reaching this equilibrium is referred to as pre-reaction, and the time to reach the equilibrium is referred to as the pre-react time. Pre-react times vary with temperature and amine species. When urea is used, the pre-react times range from 4 to 16 hours depending on temperature.

The mole ratio of formaldehyde to formaldehyde scavenger is also important and conditions are optimized to achieve the best performance of the binder. When urea is used, the mole ratio of formaldehyde to urea, the F/U, is optimally maintained between 0.8 and 1.2. If the extension level results in an F/U of less than 0.8, the opacity increases significantly along with the ammonia emissions. If the extension level results in an F/U of greater than 1.2, formaldehyde emissions increase and the risk of precipitation of dimethylolurea is greatly increased. For this reason, in traditional binders using urea as the formaldehyde scavenger (or a combination of urea and ammonia), the extension level is dictated by the amount of free formaldehyde in the base resin.

There are however disadvantages of pre-reacting resins with urea prior to forming the binder. Because free formaldehyde stabilizes the tetradimer in the resin, pre-reacting with urea will reduce the % free formaldehyde in the resin, hence reducing resin stability over time. Further, long pre-react times, as observed when urea is used as the formaldehyde scavenger, shorten the shelf life of the binder. In addition, pre-reacting with urea takes time, requires pre-react tanks and binder tanks, and urea needs to be stored in heated storage tanks. There is a need for an extender system for phenol-formaldehyde resins that does not have the above disadvantages.

Plywood and Engineered Lumber

It is also well known to use phenol-formaldehyde resins and phenol-formaldehyde resin-extenders and fillers as plywood and engineered lumber adhesives in the industry. Many raw materials may be added to phenol-formaldehyde resins to improve the bond qualities of the adhesive in plywood panels and engineered lumber such as laminated veneer lumber, including borax, potassium carbonate, polyvinyl alcohol, etc. Urea has also been added to plywood and engineered lumber resins and adhesives to improve pre-press tack, bond quality, cost, assembly time tolerance, and reduce formaldehyde emissions without detrimental effects to the bonding strength of the adhesive. Urea can be added to the phenol-formaldehyde resins up to a 5% level based upon the solid weight of urea to the total resin weight at a 41% solids which includes the urea. However, when urea is used at high levels of 4 to 5 wt %, the phenol-formaldehyde resin selected must have a long assembly time (time between application of the adhesive and when the panels are hot pressed or pre-pressed), to eliminate dryout of the adhesive. Therefore, the use of urea in plywood resins is generally limited to levels lower than 5%, generally equal to or below 3%.

Oriented Strand Board

Spray dried oriented strand boards (OSB) and wafer board resins are very sensitive to any extender or filler that is used in the resin. Many attempts have been made to use small amounts of urea or urea-formaldehyde resins as extenders in various phenol-formaldehyde and phenol-melamine-formaldehyde resins. Unfortunately, most of these attempts to extend the resin are not commercially successful because the urea interferes with the ability of the resin to be spray dried. Urea contained in the phenol-formaldehyde resins for OSB or wafer board applications are typically limited to 1% urea for scavenging free formaldehyde. Otherwise the urea will affect the properties of the OSB wafer board such as its durability.

High Pressure Laminating Resins

Phenol-formaldehyde resins used to manufacture high pressure laminates are typically produced by reacting phenol and formaldehyde using an alkaline catalyst such as sodium hydroxide. Typical mole ratios of formaldehyde to phenol range from 1.0 to 2.5 moles of formaldehyde per mole of phenol with the preferred range from 1.2 to 1.9 moles of formaldehyde per mole of phenol. Catalyst levels range from 0.2% to about 6%, preferably from 0.5 to 3%. These materials are reacted to a suitable endpoint, cooled with vacuum, and usually distilled to remove the water present from the formaldehyde solution as well as the water of condensation from the polymerization reaction. They may be used in this state or an organic solvent such as methanol can be added to reduce the % solids and viscosity and aid in penetration of the kraft paper substrate. Modifiers such as urea can be added to reduce residual free formaldehyde levels. Other modifiers may also be added to achieve specific purposes.

High Pressure Laminates are made from several layers of paper that have been impregnated with thermosetting resins, dried (B-staged), and finally cured under pressure in a heated press. The surface of the laminate is made from a decorative paper (a solid color or printed with a pattern) that is impregnated with a melamine-formaldehyde resin. Underneath this surface are several layers of kraft paper that have been impregnated with a phenol-formaldehyde resin and function as a core for the laminate. Both the resin impregnated decorative paper and the resin impregnated kraft core paper are passed through ovens to increase the molecular weight of the resin component, and reduce the volatile level in the sheet (B-staging). After B-staging, a decorative sheet is laid up with several layers of the kraft core paper and loaded into a press. The press is brought up to pressure, typically 1000 psi, and then heated up to temperatures typically ranging from about 120° C. to 160° C. for 20 to 60 minutes. This is done to consolidate the multiple paper layers and cure the resin components. At the end of that time period the press is cooled and finally the pressure is released.

Some laminates are produced whose primary use is for flat surfaces. Other laminates are produced that are postformed (thermoformed) into more complex shapes after the above pressing process is complete. These laminates are used for counter tops where the front edge is formed into a lip and the back edge is formed up into a back-splash area. The postforming laminates are usually under cured in the original pressing cycle or use a very formable (soft) resin. If the laminates are fully cured or utilize a stiffer more brittle resin, when they are postformed the laminates will crack and break This makes an unacceptable product for consumers. Brittle laminates also tend to chip and break when they are cut to size or machined prior to use or can be more breakage prone during installation and use. This is also unacceptable to the consumer.

Another problem in the laminating industry is the release of volatile organic components into the atmosphere during the B-staging process. One of these volatile organic components is phenol. Typical levels of free phenol in the phenol-formaldehyde resin used to impregnate the kraft core paper are in the 5–15% range. One method to reduce the free phenol level in the base phenol-formaldehyde resin is to increase the amount of formaldehyde (relative to the phenol) in the resin as manufactured. Unfortunately this usually results in a more brittle resin that when cured is unacceptable for manufacturing postforming laminates.

Paper Saturating Resins

Saturating resins, without modifiers, for oil filter, overlay, and for paint roller tube applications are typically low mole ratio resins in the range of 0.8–1.7 F/P. The low mole ratio resins give the treated paper more flexibility for pleating before curing. They are base catalyzed resins and are usually high molecular weight resins which are water insoluble. A distillation step is required and then the distilled resin is solvated in an alcohol—such as methanol, isopropanol, or ethyl alcohol. The resin is usually neutralized to a pH of 6.5–7.5 with acid to give lighter color cure. The resin is then applied to base paper, usually in dip roller pans, and then the treated paper goes into an oven to drive off the solvent, resulting in "B" staged paper. This paper is then rolled and shipped to the oil filter manufacturers. They then pleat and cut the paper and then it is cured in an oven. The cured paper will then have oil, temperature, water, and chemical resistant properties. Saturating resins for plywood overlays work in a similar way, except the treated paper is not pleated but is bonded onto plywood or other substrate with heat and pressure, which cures the resin.

There are some high mole ratio saturating resins, typically in the range 1.8–2.5 F/P which are water soluble. These, however, must be modified with a plasticizer such as a thermoplastic latex to give the treated paper pleatability. The high mole ratio resins alone will be too high in cross link density and therefore brittle when cured. The advantage in waterborne resins are no emissions from solvent and due to higher F/P mole ratios there will be less emissions of free phenol.

Other Uses

Phenol-formaldehyde foam resins are used to make open or closed cell foams when cured. Such foams are primarily used to make floral foam supports for supporting flower stems in water. The foam is able to soak up water many times it's weight to provide water for the flowers. Such foams are primarily open cell foams with perforations in cell walls. Other uses for phenol-formaldehyde foams are dense foams used for models similar to balsa wood, foam to hold jewelry, foam used to make molds for foot prosthetics and closed cell foam for barrier and insulation type properties.

Other uses of phenol-formaldehyde resins include abrasive binders, friction binders, and phenol-formaldehyde coated foundry sand binders.

Melamine-Formaldehyde Resins

Melamine-formaldehyde resins provide binders that are clear. Hence such resins are suitable for products such as ceiling tiles, paper laminates (e.g., veneer for countertops), and molded articles. However, currently there is a shortage of melamine crystal used in manufacturing the melamine-formaldehyde resins. In addition, melamine crystals are expensive.

Acoustic ceiling tiles are presently back-coated with melamine resins in order to make them more rigid and humidity-resistant when installed in suspended ceilings. Melamine resins are also used for the preparation of decorative or overlay paper laminates due to their excellent color, hardness, and solvent, water, chemical resistance, heat resistance and humidity-resistance.

Molded articles, such as dinnerware, are presently prepared with a combination of melamine-formaldehyde resins and urea-formaldehyde resins. The resins are combined because the melamine-formaldehyde resin is too expensive to use by itself. However, such articles are generally not very water-resistant or dimensionally stable.

It would be beneficial to provide an extender for both phenol-formaldehyde resins and melamine-formaldehyde resins in order to reduce formaldehyde emissions, phenolic emissions, improve properties of the products obtained with the resins, and to reduce overall cost of the resins.

SUMMARY OF THE INVENTION

The present invention is directed to the discovery that cyclic urea prepolymers may be used as modifiers of thermosetting phenol-formaldehyde and melamine-formaldehyde based resins for a variety of end uses. The cyclic urea prepolymers are urea-formaldehyde polymers containing at least 20% triazone and substituted triazone compounds. The use of cyclic urea prepolymer in such resin binders provides properties superior to the properties of using the resin alone in many applications. The resins are modified with the cyclic urea prepolymer, either by reacting into the base resin system, blending with the completed base resin system, or blending into a binder preparation.

The amount of cyclic urea prepolymer added to the resin is dependent on the application. When blending the cyclic urea prepolymer into a binder system, several modifier levels are possible. The present invention, when used as described, results in, for example, significantly lower phenol and phenolic emissions over phenol-formaldehyde resin systems. The present invention when used to modify melamine-formaldehyde resins was found to impart superior stability over the non-modified resins. The present invention, when used as described, results in, for example, significantly lower stack opacity and better thermal stability over traditional binders using urea or urea/ammonia as resin extenders.

The present invention is particularly directed to the use of a binder or adhesive comprising a phenol-formaldehyde or melamine-formaldehyde resin modified with 1 to 95 wt % based on resin solids of a cyclic urea prepolymer either during manufacture of the resin or post added to the resin wherein the cyclic urea prepolyrner has a mole ratio of urea:formaldehyde:ammonia or a primary amine of about 0.1 to 1.0:0.1 to 3.0:0.1 to 1.0.

The present invention is particularly directed to the use of the binder in a variety of products including consolidated wood products such as plywood, engineered lumber such as laminated veneer lumber, hard board, fiber board, oriented strand board, and other products such as insulation, laminates, abrasive coatings, friction binders, foams, foundry binders, and petroleum recovery binders. The present invention is further directed paper saturating resins for oil filters, overlay, paint roller tubes and the like. The binders of the present invention are further used to prepare products such as ceiling tiles, paper laminates (e.g., veneer for countertops), and molded articles.

DETAILED DESCRIPTION OF THE INVENTION

The Cyclic Urea Prepolymer

The present invention is based on the discovery that a cyclic urea prepolymer, formed by a reaction of urea, formaldehyde, and ammonia or a primary amine, is useful as a modifier in phenol-formaldehyde resins and melamine-formaldehyde resins. The present invention can be used to further modify a resin system either by reacting into the base resin system, blending with the completed base resin system, or blending into a binder preparation.

The resins may then be used in binder compositions which comprise a variety of liquid forms, including solutions, miscible liquids, or dispersions and the like and combinations of such liquid forms depending upon the optional ingredients blended into the binder composition. Where the term solution or any of the variations thereof is used herein it is intended to include any relatively stable liquid phase.

Preparation of the Cyclic Urea Prepolymer

The cyclic urea prepolymer may be prepared by any suitable method. For example, urea, formaldehyde, and ammonia or primary amine are mixed and heated to the desired temperature for a set period of time to form a cyclic urea prepolymer. Preferably the mole ratio of reactants for the cyclic urea prepolymer are as follows:

| Formaldehyde: | About 0.1 to 3.0 |
|---|---|
| Ammonia or Primary Amine: | About 0.1 to 1.0 |
| Urea: | About 0.1 to 1.0 |

Any combination of the above mole ratios is contemplated; however, preferably the mole ratio of Urea:Formaldehyde:Ammonia or Primary Amine is about 2.0:2.0:1.0 to 1.0:4.0:1.0 and more preferably about 2.0:4.0:1.0 depending on the application. It is contemplated that "ammonia or primary amine" also encompasses the use of both ammonia and a primary amine or more than one primary amine.

Processes of making cyclic urea prepolymers are recognized in the art. In a preferred embodiment, the cyclic urea prepolymer may be prepared by charging a reaction vessel with formaldehyde, ammonia, and urea while maintaining the temperature below about 70° C., preferably about 60° C. The order of addition is not critical, but it is important to take care during the addition of ammonia to formaldehyde (or formaldehyde to ammonia), due to the exothermic reaction. In fact, due to the strong exotherm, it may be preferred to charge the formaldehyde and the urea first, followed by the ammonia. This sequence of addition allows one to take advantage of the endotherm caused by the addition of urea to water to increase the rate of ammonia addition. A base may be required to maintain an alkaline condition throughout the cook.

Once all the reactants are in the reaction vessel, the resulting solution is heated at an alkaline pH to between about 60 and 105° C., preferably about 85 to 95° C., for 30 minutes to 3 hours, depending on mole ratio and temperature, or until the reaction is complete. Once the reaction is complete, the solution is cooled to room temperature for storage. The resulting solution is storage stable for several months at ambient conditions. The pH is between 5 and 11.

The yield is usually about 100%. The cyclic urea prepolymers contain at least 20% triazone and substituted triazone compounds. The ratio of cyclic ureas to di- and tri-substituted ureas and mono-substituted ureas varies with the mole ratio of the reactants. For example, a cyclic urea prepolymer having the mole ratio of 1.0:2.0:0.5 U:F:A resulted in a solution characterized by $C^{13}$-NMR and containing approximately 42.1% cyclic ureas, 28.5% di/tri-substituted ureas, 24.5% mono-substituted ureas, and 4.9% free urea. A cyclic urea prepolymer having the mole ratio of 1.0:1.2:0.5 U:F:A resulted in a solution characterized by $C^{13}$-NMR and containing approximately 25.7% cyclic ureas, 7.2% di/tri-substituted ureas, 31.9% mono-substituted ureas, and 35.2 free urea.

In addition, the cyclic urea prepolymer may be prepared by a method such as disclosed in U.S. Pat. No. 5,674,971, which is hereby incorporated by reference in its entirety. The cyclic urea prepolymer is prepared by reacting urea and formaldehyde in at least a two step and optionally a three-step process. In the first step, conducted under alkaline reaction conditions, urea and formaldehyde are reacted in the presence of ammonia, at an F/U mole ratio of between about 1.2:1 and 1.8:1. The ammonia is supplied in an amount sufficient to yield an ammonia/urea mole ratio of between about 0.05:1 and 1.2:1. The mixture is reacted to form a cyclic triazone/triazine or cyclic urea prepolymer which forms the building block for the ultimate resin.

Water soluble triazone compounds may also be prepared by reacting urea, formaldehyde and a primary amine as described in U.S. Pat. Nos. 2,641,584 and 4,778,510, each of which is incorporated by reference in its entirety. These patents also describe suitable primary amines such as, but are not limited to, alkyl amines such as methyl amine, ethyl amine, and propyl amine, lower hydroxyamines such as ethanolamine cycloalkylmonoamines such as cyclopentylamine, ethylenediamine, hexamethylenediamine, and linear polyamines. The primary amine may be substituted or unsubstituted.

Skilled practitioners recognize that the reactants are commercially available in many forms. Any form which can react with the other reactants and which does not introduce extraneous moieties deleterious to the desired reaction and reaction product can be used in the preparation of the urea-formaldehyde resin of the invention.

Formaldehyde is available in many forms. Paraform (solid, polymerized formaldehyde) and formalin solutions (aqueous solutions of formaldehyde, sometimes with methanol, in 37%, 44%, or 50% formaldehyde concentrations) are commonly used forms. Formaldehyde also is available as a gas. Any of these forms is suitable for use in the practice of the invention. Typically, formalin solutions are preferred as the formaldehyde source.

Similarly, urea is available in many forms. Solid urea, such as prill, and urea solutions, typically aqueous solutions, are commonly available. Further, urea may be combined with another moiety, most typically formaldehyde and urea-formaldehyde, often in aqueous solution Any form of urea or urea in combination with formaldehyde is suitable for use in the practice of the invention. Both urea prill and combined urea-formaldehyde products are preferred, such as Urea Formaldehyde Concentrate or UFC 85. These type of products are disclosed in, for example, U.S. Pat. Nos. 5,362,842 and 5,389,716.

Skilled practitioners also recognize that ammonia is available in various gaseous and liquid forms, particularly including aqueous solutions at various concentrations. Any of these forms is suitable for use. However, commercially-available aqueous ammonia-containing solutions are preferred herein. Such solutions typically contain between about 10 and 35% ammonia. A solution having 35% ammonia can be used providing stability and control problems can be overcome. An aqueous solution containing about 28% ammonia is particularly preferred. Anhydrous ammonia may also be used.

Ammonia and/or late additions of urea are commonly used prior art techniques to reduce free formaldehyde levels in urea-formaldehyde polymer systems. The former technique suffers from reducing the cured polymers resistance to hydrolysis. The latter technique suffers from a tendency to produce a polymer system that releases smoke during the cure cycle. This invention reduces or eliminates both of these problems, yet still significantly reduces free formaldehyde levels during cure and in the cured product.

The reactants may also include a small amount of a resin modifier such as ethylenediamine (EDA). Additional modifiers, such as melamine, ethylene ureas, and primary, secondary and tertiary amines, for example, dicyanodiamide can also be incorporated into the resin of the invention. Concentrations of these modifiers in the reaction mixture may vary from 0.05 to 5.00%. These types of modifiers promote hydrolysis resistance, polymer flexibility and lower formaldehyde emissions.

The cyclic urea prepolymer is then used as a modifier of the resin. The modifier level using the cyclic urea prepolymer, reported as a percent of binder solids, is preferably from 1% to 95%, but greater amounts are also contemplated. Binder solids refer to the percent phenol-formaldehyde resin solids plus the percent modifier solids. Thus, typically the resin and cyclic urea prepolymer are combined to obtain 5 to 99 wt % resin solids and 1 to 95 wt % cyclic urea prepolymer solids. Preferred ranges are dependent on the application.

Phenol-Formaldehyde Resins

The phenol-formaldehyde resole may be prepared by any suitable manner. For example, the phenol-formaldehyde resin may be prepared by reacting a molar excess of formaldehyde with phenol under alkaline reaction conditions. Formaldehyde is used in an amount of between about 0.5 and 4.5 moles per mole of phenol, with preferred ranges dependent on the application. The % free formaldehyde is typically between 0.1% and 15%. And the % free phenol is typically between 0.1% and 20%. Preferred ranges depend on the application.

Alkaline reaction conditions are established by adding an alkaline catalyst to an aqueous solution of the phenol and formaldehyde reactants. During the initial reaction of the phenol and formaldehyde, only that amount of alkaline catalyst necessary to produce a resin need be added to the reaction mixture. Suitable amounts of alkaline catalyst are known to those skilled in the art. Typically, at least about 0.005 mol of alkaline catalyst per mol of phenol is used, with an amount between about 0.01 and 1 mol per mol depending on the application. All the catalyst can be added initially to the reactants or the catalyst can be added incrementally in two or more additions or continuously over a defined time period.

Alkaline catalysts normally used for preparing phenol-formaldehyde resins also can be used in accordance with the present invention. Typical alkaline catalysts include alkali metal and alkali earth hydroxides such as lime, lithium hydroxide, sodium hydroxide and potassium hydroxide; alkali metal carbonates such as sodium carbonate and potassium carbonate; and amines. Based on considerations of cost and availability, sodium hydroxide is used most often.

The cyclic prepolymer may be reacted into the phenol-formaldehyde resin or added as a post blend depending upon the needs of the resin. The preferred method is dependent on the application. For example, the cyclic urea prepolymer is blended with the prepared phenol-formaldehyde resin to produce a binder suitable for insulation.

It may be preferable to react the cyclic urea prepolymer with formaldehyde before attempting to react the material with phenol to tie it into the overall polymer structure. Typically cyclic urea prepolymer is reacted with formaldehyde (50%) at a ratio of about 4 to 1, preferably about 2:1 by adding the two together in a suitable container, adjusting the pH to about 8.5 to 10.0, preferably about 9.0 to 9.5 and heating to 80 to 100° C., preferably about 90 to 95° C. The mixture is reacted under these conditions for about two hours. This product is then added to the front of the phenol-formaldehyde resin with half of the formaldehyde that was added taken out from the resins formaldehyde charge. The resin is normalized and used for its application.

The reaction with phenol is achieved by adding the pre-methylolated cyclic urea prepolymer to all the phenol normally used to make the base resin and adding NaOH (50%) to bring the pH to about 9.5 to 11.5, preferably about 10.5. The mixture is heated to about 80 to 100° C., preferably about 90–95° C. for about one hour or longer depending upon the pH. The product of this step is a phenol-cyclic urea prepolymer reaction product that can be used to make the base resin.

Concentration of raw materials is not critical. Water can be added, or removed by distillation, to adjust the % non-volatiles to the desired level.

The resin and cyclic urea prepolymer are combined to obtain 1 to 95 wt % cyclic urea prepolymer solids, preferably 10 to 70 wt %. Preferred ranges are dependent on the application.

Insulation

A phenol-formaldehyde resin can be used as described above preferably with an amount of formaldehyde between about 2.0 and 4.5, more preferably between about 2.5 and 4.5, moles per mole of phenol. The % free formaldehyde is typically between about 4% and 15%. And the % free phenol-formaldehyde typically between about 0.1% and 2%. Typically, at least about 0.05 mol of alkaline catalyst per mol of phenol is used, more typically, between about 0.1 and 0.3 mol per mol of phenol.

The cyclic urea prepolymer is combined with the phenol-formaldehyde resin composition and optionally, a suitable latent catalyst. When an acid cure is desirable, a latent catalyst is added to the phenol-formaldehyde resin composition in an amount effective to neutralize the alkalinity of the base resin and lower the pH to give an acid cure. Typical amounts are at least about 2 wt %, preferably about 4 to 10 wt %, based on the weight of binder solids. Suitable latent catalysts include ammonium sulfate and similar latent acid catalysts as known in the art. In addition, the binder may contain suitable coupling agents.

The phenol-formaldehyde resin based binder for use in insulation, such as fiberglass or mineral wool insulation, may be prepared by combining and mixing the phenol-formaldehyde resin with the desired formaldehyde scavenger and premixing until free formaldehyde approaches 0%. The premix time will be dependent on the scavenger used. For example, if ammonia is used, the premix time will be on the order of minutes whereas if urea is used, the premix time will be from 8 to 16 hours, depending on temperature. The remaining binder ingredients including, cyclic urea prepolymer, latent acid catalyst, coupling agents, dedusting oils, and desired dilution water, can then be added to the premixed resin.

The resin and cyclic urea prepolymer are combined to obtain 1 to 95 wt % cyclic urea prepolymer solids, preferably 10 to 70 wt %, more preferably 20 to 60 wt %.

The binder can be used immediately and may be diluted with water to a concentration suitable for the desired method of application, such as by spraying onto the glass fibers. Binders used for preparing insulation are generally very dilute, requiring water dilutability greater than 50:1. Both the present invention and the binders made from the present invention have the necessary water dilutability characteristics. Other conventional binder additives compatible with the resin composition and silane coupling agent may be added to the binder.

Any suitable method may be used to form the fibers for use in preparing insulation. For example, for glass fibers, use can be made of discontinuous or staple glass fibers such as are formed by the rapid attenuation of multiple streams of molten glass by high pressure streams of air or steam directed angularly downwardly onto the streams of molten-glass flowing there between. Use can be made of continuous or textile fibers such as are formed by the rapid attenuation of molten streams of glass. Continuous glass fibers may be employed in the form of mats fabricated by swirling the endless filaments or strands of continuous fibers, or they may be chopped or cut to shorter lengths for mat or batt formation. Use can also be made of ultra-fine fibers formed by the attenuation of glass rods. Also, such fibers may be treated with a size, anchoring agent or other modifying agent before use.

The binder can be applied to the fibers by flooding the collected mat of fibers and draining off the excess, by applying the binder composition onto the fibers during mat formation, by spraying the glass fiber mat or the like. The layer of fiber with binder is then compressed and shaped into the form and dimensions of the desired insulating product such as pipe, batt or board and passed through a curing oven where the binder is cured, thus fixing the size and shape of the finished insulation product by bonding the mass of fibers one to another and forming an integral composite structure. For cure, the mass is heated to a temperature in excess of 175° C. and preferably within the range of 205 to 345° C. for a time sufficient to cure the components. The fiber component will represent the principal material of the insulation product. Usually 99–60% by weight of the product will be composed of fibers while the amount of binder will be in reverse proportion ranging from 1–40%, depending upon the density and character of the product.

Glass insulations having a density less than one pound per cubic foot may be formed with binders present in the lower range of concentrations while molded or compressed products having a density as high as 30–40 pounds per cubic foot can be fabricated of systems embodying the binder composition in the higher proportion of the described range.

Fiber insulation can be formed as a relatively thin product of about 0.25 to 1.5 inch or it can be a thick mat of 12 to 14 inches or more. The time and temperature for cure will depend in part on the amount of binder in the final structure and the thickness and density of the structure that is formed. For a structure having a thickness ranging from 0.25 to 1.5 inch, a cure time ranging from 1–5 minutes will be sufficient at a cure temperature within the range of 400–600 F.

The desired product properties obtained from traditional extenders and formaldehyde scavengers are maintained (i.e., color, tensile strength, moisture resistance, moisture absorption, recovery, etc.). In addition, these desired properties are maintained at lower phenolic solids levels than could be achieved with prior art. Further, the ability to go to lower phenolic solids levels results in reduced phenolic emissions and lower forming hood emissions. The present invention also lends improved anti-punk properties to the finished insulation product, and when used with ammonia or another rapid formaldehyde scavenger, eliminates pre-react time. Elimination of pre-react time results in increased binder stability. Improved anti-punk is desirable in products requiring greater thermal stability, for example pipe insulation.

Consolidated Wood Products

The binders of the present invention can be used in consolidated wood products such as plywood, engineered lumber, oriented strand board, particle board, and the like. In this field, typically the term adhesive is used instead of binder. Thus, when referring to consolidated wood products, the term adhesive shall be used.

Plywood and Engineered Lumber

Typically the cyclic urea prepolymer is either cooked into the plywood resin or added to a plywood resin to provide good bonding performance of the adhesive (binder). The phenol-formaldehyde resin is prepared having a mole ratio of about 1.8 to 2.4 moles formaldehyde per mole phenol and an alkaline catalyst level of about 0.5 to 1.0 moles catalyst per mole phenol. Typically the amount of cyclic urea prepolymer solids by weight in the adhesive based upon the total resin solids by weight is between about 1 and 40, preferably between 1 and 20%.

Methylolated cyclic urea pre-polymer is typically prepared by reacting urea, ammonia and formaldehyde and then reacting with two moles of formaldehyde to produce the methylolated cyclic urea pre-polymer having a 50% solids. This cyclic urea prepolymer is then reacted into a standard phenol-formaldehyde resin during the cook cycle of the phenol-formaldehyde resin. Phenol is combined with formaldehyde, water, cyclic urea prepolymer, and caustic. The mixture is heated and allowed to exotherm. Then additional caustic and then additional formaldehyde is added. The mixture is heated, allowed to exotherm, and held to a desired endpoint.

Adhesive mixtures typically contain water, extenders, fillers, caustic, performance additives, and phenol-formaldehyde resin. Typical fillers and extenders include: corn, wheat, soya, and other cereal flours and derivatives, finely ground nut shells, barks, and agricultural furfural waste residues. The adhesive mixtures are then applied to plywood veneers and the veneers are then combined in plies of three or more using a hot press to cure and bond the adhesive. Methods of applying adhesive to plywood and pressing are well known in the art.

Oriented Strand Board

Is known that dimethylol urea is not a stable compound in that in the presence of another formaldehyde reactive compound the dimethylol urea will donate its two formaldehyde groups to the more stable phenol, ammonia, melamine etc. This leaves raw urea in the resin which reduces the durability of the OSB or waferboard very significantly. It was discovered that cyclic urea prepolymer is much more stable and the use of the cyclic prepolymer provides improved durability over resins extended with urea.

The cyclic urea prepolymer can be used at levels as high as 10% without significant impact on the performance of the product when cooked into the resin and/or used as a formaldehyde scavenger to prevent formaldehyde emissions. Spray dried resins cannot be properly spray dried if the free urea content is higher than 1 to 2% while the copolymer of cyclic urea, formaldehyde and phenol can be spray dried up to and including 50%.

Paper Saturating Resin

Cyclic urea prepolymer can also be added to saturating type phenol-formaldehyde resins. Saturating resins are used to saturate paper for oil filters, overlay paper, and paint roller tube applications. The cyclic urea prepolymer acts as a plasticizer "softening" the cure of the phenol-formaldehyde resin. Benefits of using the cyclic urea prepolymer include improving the flexibility of oil filters allowing easier "pleatability," i.e., formation of the paper pleats in the oil filter. Also the paper in the filter cartridge could withstand greater stresses allowing longer life. In the overlay paper and paint roller tube applications a "softer" cure allows easier machinability, i.e., less chipping and breaking during handling, cutting and sawing. In air filter paper the high level of nitrogen from the cyclic urea prepolymer will reduce the flammability of the filter paper. In all of these saturating applications, lower free phenol resins result.

By diluting the phenol-formaldehyde resin with cyclic urea prepolymer, free phenol and other volatile phenolic moiety levels are reduced which reduces air pollution. Because of the plasticizing effect achieved with the cyclic urea prepolymer, higher F:P mole ratio phenol-formaldehyde resins (traditionally more brittle) can be used which further reduces the free phenol and volatile phenolic moiety levels.

Water soluble saturating resins are typically in the range of 1.8 to 2.5 moles formaldehyde per mole phenol. Due to the high mole ratio and increased cross-link density, these resins typically are modified with a plasticizer such as latex to give treated paper pleatability. Water borne resins have the advantage of reduced emissions due to lower % free phenol and reduced volatile organics. The plasticizing effect achieved with the cyclic urea prepolymer provides greater flexibility in the above phenolic resins. The cyclic urea prepolymer can be cooked into the base resin or post added.

High Pressure Laminating Resins

Cyclic urea prepolymer in laminating type phenol-formaldehyde resins acts as a plasticizer "softening" the cure of the resin. This makes the laminate more post-formable and tougher. Products produced with such resins resist chipping and breakage during machining steps. Diluting the phenol-formaldehyde resin with cyclic urea prepolymer reduces the free phenol and other volatile phenolic moiety levels of the phenol-formaldehyde resin which reduces air pollution. Because of the plasticizing effect achieved with the cyclic urea prepolymer, higher F:P mole ratio PF resins (traditionally more brittle) can be used which further reduces the free phenol and volatile phenolic moiety levels.

Phenol-formaldehyde resins of the present invention used for the manufacture of high pressure laminates generally contain F:P mole ratios of 1.2 to 3.5, preferably 1.4 to 2.5. Generally, 1 to 50 parts, preferably 5 to 40, of cyclic urea prepolymer are added per 99 to 50 parts of phenol-formaldehyde resin (total adds up to 100 parts). Lower levels of cyclic urea prepolymer generally perform better with lower F:P phenol-formaldehyde resins whereas higher levels perform better with higher F:P phenol-formaldehyde resins.

Any phenol-formaldehyde catalyst may be used such as, but not limited to sodium hydroxide. Generally catalysts are added in amounts from about 0.2 wt % to about 6, preferably, about 0.5 to 3.

The pH of the phenol-formaldehyde resin is typically from about 3.5 to about 8.9, preferably from about 6.5 to 8.5. Lower pHs can help reduce the degree of resin cure and reduce laminate brittleness but too low pHs can increase the degree of cure of the melamine resin impregnated surface sheet at the interface.

Methanol may be added, as necessary, to maintain solubility of the phenol-formaldehyde resin. Alternatively, water borne phenol-formaldehyde resins may also be used. Generally water borne laminating resins are similar to the solvent borne resin except for the lack of an organic solvent and that they are usually lower in molecular weight than their solvent borne counterparts. This is primarily to achieve an acceptable degree of penetration into the kraft paper core sheet. Because they are lower in molecular weight, they typically have a higher level of free phenol. The practice of this invention with water borne phenol-formaldehyde resins can significantly reduce their free phenol levels. For the solvent borne resins, the percentage of methanol or other organic solvent can range up to about 25% but could go higher without interfering with the utility of this invention. The water content may be up to 30+%. Solids (non-volatile) contents should range from about 50% up to 75+%. Viscosities can range from less than 100 cps to over 1000 cps.

Other Phenol-Formaldehyde Resin Applications

Other uses for the cyclic urea prepolymer include addition to abrasives coating resins as a formaldehyde scavenger and/or modifier. Any phenol-formaldehyde resin used as an abrasive or friction binder may be modified. The phenol-formaldehyde resin is heated to about 40 to 70° C., preferably about 55° C. Cyclic urea prepolymer is added to the resin in an amount of 1 to 20 parts per 100 parts of resin.

The cyclic urea prepolymer may be used in phenol-formaldehyde foams prepared in any manner known in the art. The phenol-formaldehyde foams typically range from about 1.7 to 3.0 moles formaldehyde per mole phenol. Urea is typically added to scavenge formaldehyde in these resins. The cyclic urea prepolymer can be prepared to scavenge formaldehyde or it can be added to further modify the base phenol-formaldehyde resin.

Generally phenol and formaldehyde are reacted with a base catalyst to form the base resin. The resin is then neutralized to a pH between about 4 and 8 with an acid. Water is then distilled from the resin to a low water content, approximately 5 to 10%. The resin typically has a high viscosity of about 2,000 to 20,000 cps. The cyclic urea prepolymer may be reacted into the phenol-formaldehyde resin or post added to replace 5% to 70% of the phenolic solids.

In order to foam the resin, surfactants and/or wetting agents are mixed into the resin to create bubbles within the resin. Then a low boiling liquid such as CFC, HCFC, pentane or hexane is added to the mixture. A strong acid is added to the resin to initiate curing of the phenol-formaldehyde resin. This reaction generates heat causing the low boiling liquid to vaporize within the bubbles in the resin. As a result a foam is created from this mixture. Within about 10 minutes the foam rises to its maximum height and hardens when fully cured.

The cyclic urea prepolymer may also be used as a crosslinker in novolac resins. The cyclic urea prepolymer may be used as a partial or complete replacement of the hexamine cross linker typically used in the coating of these novolac resins. The cost of the prepolymer is less than the cost of commercially available hexamine and its use will allow for a potential cost reduction to the user.

In the manufacturing of low nitrogen containing foundry sands, the hexamine cross linker is replaced in part with another cross linking agent that does not contain nitrogen. Nitrogen when present in coated foundry sand can give rise to nitrogen defects during steel casting. It is advantageous to have as low nitrogen content as possible. Usually this other cross linking agent is a thermosetting resole phenol-formaldehyde resin. During the manufacturing of these low nitrogen containing sands, the novolac resin is added, followed by the resole resin and then the hexamine. The reaction product between the cyclic urea prepolymer and a phenol-formaldehyde resole produces a resin that may be utilized as a cross linking agent. This hybrid when used in place of the hexamine in the coating on sand with the novolac produces a thermally curable sand that has a lower nitrogen content than if the sand was produced with hexamine alone. Furthermore, the sand coater does not have to handle two separate components, which are the resole resin and the hexamine.

When reacted with resole components, a hybrid crosslinking compound is prepared that may also be used to thermally cure novolac coated foundry sand. This hybrid has the advantage of having a lower nitrogen percentage than using hexamine for the same given percentage added.

Sand Coating

Phenol-formaldehyde resins for use as binders for foundry sand including both resoles and novolacs. The resoles, mentioned previously have molar ratios of formaldehyde to phenol of greater than 1.0 and are reacted under alkaline conditions. Such resins are thermosetting in nature and may be used alone or in conjunction with phenol-formaldehyde novolacs and additional cross linkers.

Novolac resins have molar ratios of formaldehyde to phenol of less than 1 with preferred values between about 0.5 to 0.9. The reaction between phenol and formaldehyde is carried out below a 6 pH with less than about 3 pH being preferred. The acid catalyst level may range from about 0.1 to 3 wt % with 1 to 2 wt % preferred. Acids include, but are not limited to: sulfuric acid, hydrochloric acid, oxalic acid, sulfamic acid.

Following the reaction between the formaldehyde and phenol, the mixture may be neutralized if so required prior to dehydration. The pH may be raised to 7 pH with about 3 to 5 being preferred. Bases that may be used include, but are not limited to: alkali hydroxides and basic amines. After the reaction and neutralization, the excess water and residual free phenol monomer may be removed either by atmospheric or vacuum distillation.

Following the dehydration and while the resin solution is molten, additives such as wax or thermoplastic modifiers may be added. The resin solution may be cooled and chipped or flaked into pieces or may be dissolved into a suitable solvent.

The novolac resin so produced is thermoplastic in nature. To produce a thermosetting coating on sand, during the coating of the novolac by the sand coater, an additional cross linking agent is added. Generally the agent used is hexamine (hexamethylenetetramine). The hexamine is added between about 5 wt % and 20 wt % (based on the resin solids on the sand) with about 8 wt % to 12 wt % being preferred.

Melamine-Formaldehyde Resins

The melamine-formaldehyde resin is prepared as known in the art with the exception that part of the melamine crystal is replaced with the urea prepolymer. The melamine-formaldehyde resin is generally produced with a formaldehyde to melamine molar ratio in the range of about 0.5:1 to 6:1, preferably in the range of about 1.5:1 to 3.0:1. For example, melamine is reacted with formaldehyde under alkaline conditions in the presence of an effective amount of a catalyst and cyclic urea prepolymer. The resin and cyclic urea prepolymer are generally combined to obtain about 40 to 70 wt %, typically 60 wt %, melamine resin solids and 1 to 25 wt % cyclic urea prepolymer solids.

As used herein, the phrase "under alkaline conditions" with reference to the reaction mixture means a pH of between about 7 and 11, preferably between about 8.5 and 10.5 and, more preferably, between about 9.0 and 9.5. The alkaline condition for synthesizing the modified melamine-formaldehyde resin may be achieved simply by adding a base to an aqueous mixture to obtain the desired pH. Suitable bases include, but are not limited to, alkali metal hydroxides, such as sodium, lithium, or potassium hydroxide. Other bases include alkali metal carbonates, such as sodium carbonate and potassium carbnate, alkaline earth hydroxides, such as magnesium hydroxide, calcium hydroxide and barium hydroxide, aqueous ammonia, and amines, such as triethanolamine. Preferably caustic soda (sodium hydroxide) is used.

Although melamine is specifically mentioned for use in the practice of this invention, and is generally preferred, the melamine may be partially or totally replaced with other suitable amine-containing compounds. Other suitable compounds include urea, thiourea, dicyandiamide, melem, melam, melon, ammeline, ammelide, substituted melamines, guanamines, or mixtures thereof. Substituted melamines include the alkyl melamines and aryl melamines which can be mono-, di-, or tri-substituted. In the alkyl-substituted melamines, each alkyl group can contain from 1 to 6 carbons, preferably from 1 to 4 carbons. Representative examples of some alkyl-substituted melamines are monomethylmelamine, dimethyl melamine, trimethyl melamine, monoethyl melamine, and 1-methyl-3-propyl-5-butyl melamine. In the aryl-substituted melamines, each aryl group can contain 1–2 phenyl moieties and, preferably, 1 phenyl moiety. Typical examples of an aryl-substituted melamine are monophenyl melamine or diphenyl melamine. Based on considerations of cost and availability, standard melamine is generally preferred.

Ceiling Tiles

Acoustical ceiling tiles of the lay-in type are large rectangular interfelted cellulose or mineral fiber materials with a starch binder. They are typically 48×24×½ inches and are perforated on the face side for absorption of sound. They are laid in hangers suspended from ceilings and are only supported by their edges. An anti-sag coating of heat-cured thermosetting resin such as melamine-formaldehyde resin is applied on the back side to prevent sag which tends to occur under conditions of high temperature and humidity. The coating acts as a skin to hold the center of the tile in tension and provides the necessary support to keep the suspended tile flat.

The melamine-formaldehyde extended resin may be combined with clay to form a coating which is applied to the ceiling tiles. Typical, but not limiting, resin-clay coating mixes are prepared with 4 parts clay and 1 part resin in a 55% solids aqueous mixture. The mixes are then catalyzed with the appropriate amount of a suitable catalyst such as ammonium sulfate to yield catalyzed resin-clay slurries.

The cyclic urea prepolymer provides a partial replacement for melamine crystal in the manufacture of melamine-formaldehyde resins which are used as coatings for sag resistant ceiling tiles. Cyclic urea prepolymers are more readily available than the melamine crystal. It can be post-added or reacted into the melamine resin while maintaining the sag resistance as measured by tensile modulus of the cured resin. Also retained is the heat and moisture resistance of the melamine-formaldehyde resin.

Overlay paper Laminates

A melamine formaldehyde resin is modified with 1–25% cyclic urea prepolymer solids by cold addition or by reaction. The resin contains resin solids of 50–60% and is storage stable for 4–6 weeks. Cured overlay paper treated with the cyclic urea modified melamine-formaldehyde resins retain water and heat resistance. Preferably, the melamine-formaldehyde resin has a F:M molar ratio of 1–6.

Methods, techniques and equipment for preparation of decorative laminates are well known to those skilled in the art, and need not be described in detail. In general, a generally porous substrate, such as paper or a fabric web, is impregnated with a solution of the modified melamine resin and dried (B-staged). The dried resin impregnated substrate, along with other layers, is pressed usually with heat to form a laminate. At this point, the laminate may be only partially cured. Thereafter, the laminate may be post-formed and cured completely.

A typical decorative laminate is prepared from (1) a rigid substrate, (2) a melamine resin impregnated decorative substrate, and, in some cases (3) a melamine resin impregnated overlay sheet. In such decorative laminates, the rigid substrate may consist of any suitable material, such as particle board, a resin-binded wood fiberboard, a plurality of phenol-formaldehyde resin-impregnated sheets, etc. These composites are heated under pressure to form a single component which can be incorporated into furniture, used on countertops or flooring, etc.

The amount of resin solids incorporated into these laminates varies from 30% to 80% based on the weight of the total laminate, and typically depends as understood by those skilled in the art on the type of application and the type of materials used to make the laminate. The lower percentages are generally used for decorative substrates such as decorative print sheets and the higher amounts are used in overlay sheets. After the substrate is impregnated with the aqueous resin, it is dried to a suitable volatile content (B-staged) and the substrates and sheets then are assembled into a laminate between two pressing plates. A laminate is then formed in this fashion under a specific pressure (generally 200–2000 psi depending on process and/or product) and temperature (generally 120–175° C.) for periods of 0.5 to 30 minutes. A laminate made in this manner must then pass several physical tests, including impact resistance, abrasion resistance, and resistance to boiling water.

Molded Articles

Molded articles, such as dinnerware, may be prepared using melamine resins modified with the cyclic urea prepolymer. The cyclic urea allows replacement of the less readily available melamine solids while maintaining water and heat resistance as well as the dimensional stability of the molded articles. Molded articles can be prepared from pulp, glass fibers, or fillers as well known in the art.

A molding composition can be prepared by mixing alpha cellulose pulp and the resin and then drying to an intermediate. The intermediate is ground and then sent to storage. Prior to hot molding the final article, the intermediate is ball milled together with catalysts, colorants, UV stabilizer, and a mold lubricant. The ground mixture is then assembled between printed sheets of paper that are impregnated with the cyclic urea prepolymer modified melamine-formaldehyde resin.

The following examples are for purposes of illustration and are not intended to limit the scope of the claimed invention.

EXAMPLES

Example 1

Preparation of Cyclic Urea Prepolymer a) A cyclic urea prepolymer having a mole ratio of 1.0:2.0:0.5, urea:formaldehyde:ammonia (U:F:A), was prepared by charging a reaction vessel with formaldehyde, ammonia, and urea while maintaining the temperature below about 65° C. Once all the reactants were in the reaction vessel, the resulting solution was heated to about 90° C., for about 1 hour until the reaction is complete. Once the reaction was complete, the solution was cooled to room temperature. $C^{13}$-NMR indicated approximately 42.1% of the urea was contained in the triazone ring structure, 28.5% of the urea was di/tri-substituted, 24.5% of the urea was mono-substituted, and 4.9% of the urea was free.

b) A second cyclic urea prepolymer was prepared in the same manner as a) except for the mole ratio of 1.0:1.2:0.5. $C^{13}$-NMR indicated approximately 25.7% of the urea was contained in the triazone ring structure, 7.2% of the urea was di/tri-substituted, 31.9% of the urea was mono-substituted, and 35.2% of the urea was free.

c) A third cyclic urea prepolymer was prepared in the same manner as a) except for the mole ratio of 1:3:1 and it was heated to about 90° C. for 1 hour and then 100 ° C. for 2 hours. $C^{13}$-NMR indicated approximately 76.0% of the urea was contained in the triazone ring structure, 15.3% of the urea was di/tri-substituted, 8.1% of the urea was mono-substituted, and 0.6% of the urea was free.

d) A fourth cyclic urea prepolymer was prepared in the same manner as a) except for the mole ratio of 1:4:1 and it was heated to about 90° C. for 3 hours and the pH was controlled around 7.5. $C^{13}$-NMR indicated approximately 79.2% of the urea was contained in the triazone ring structure, 17.7% of the urea was di/tri-substituted, 1.6% of the urea was mono-substituted, and 1.5% of the urea was free.

Example 2

Preparation of Phenol-Formaldehyde Binders Modified with Cyclic Urea Prepolymer and Evaluation of the Binders for Fiberglass Insulation Applications The following phenol-formaldehyde binders were prepared.

1) a pre-reacted system with a 26% urea extension and a formaldehyde to ammonia mole ratio F/A) of 1.14, 2) non-pre-reacted system with a 26% urea extension and a formaldehyde to ammonia mole ratio (F/A) of 1.14, 3) a non-prereacted system using the 1.0:1.2:0.5 U:F:A system of example 1b at a 26% fortification level and an F/A of 1.14, 4) a non-prereacted system using the 1.0:2.0:0.5 U:F:A system of example 1a at a 26% fortification level and an F/A of 1.14, 5) a non-prereacted system using the 1.0:1.2:0.5 U:F:A system of example 1a at a 50% fortification level and ammonia to result in an F/A=1.14, and 6) a non-prereacted system using the 1.0:2.0:0.5 U:F:A system of example 1a at a 50% fortification level and ammonia to result in an F/A=1.14.

The composition of the binders are summarized in Table 1.

The resin had 7.4% free formaldehyde, 1.0% free phenol, a pH of 8.4 and 51% solids.

The formaldehyde emissions of each binder was tested using the tube furnace method. A premix was prepared by combining 145 g of resin with 65 g of 40% urea. The premix solution was allowed to prereact overnight (16 hours) at room temperature. The binders were prepared as outlined in Table 1. The binder was weighed onto a glass filter paper in a glass sample boat to the nearest 0.1 mg. The sample boat was transferred to the tube furnace and cured at 200° C. for 10 minutes. The air from the tube furnace was sparged through a 1:1 solution of acetonitrile to water. The solution was derivatized using dinitrophenylhydrazine and analyzed on the HPLC using a diode array detector to quantify the formaldehyde hydrazone as percent of binder solids.

Handsheets were prepared by sprinkling the binder onto a glass mat, vacuuming the excess binder off the glass, and curing the sheet in a forced air oven at 205° C. for 1.5 minutes. Dry tensiles were measured by breaking the handsheets in a tensile tester, Hot/wet tensiles were measured by soaking the handsheets in water at 85° C. for 10 minutes and then breaking them in a tensile tester while they were still hot and wet. The vent for the oven was fitted with a pipe having a light meter attached. Opacity or visible emissions were determined from either the % transmittance or the % absorbance of light. The opacity and the formaldehyde emissions results for all of the binders are displayed in Table 2.

TABLE 2

| Binder | Opacity (% Absorbance) Area/gram | % Formaldehyde Emissions | Dry Tensile Strength (psi) | Hot/Wet Tensile Strength (psi) |
| --- | --- | --- | --- | --- |
| 1 | 0.356 | 1.55 | 94.6 | 62.7 |
| 2 | 0.998 | 1.08 | 81.3 | 52.9 |
| 3 | 0.453 | 0.95 | 93.1 | 60.9 |
| 4 | 0.394 | 0.96 | 94.9 | 61.5 |
| 5 | 0.471 | 0.73 | 85.5 | 62.2 |
| 6 | 0.147 | 0.74 | 95.5 | 52.2 |

Example 3

Preparation of Phenol-Formaldehyde Adhesives Modified with Cyclic Urea Prepolymer and Use of the Adhesives in Plywood Methylolated cyclic urea pre-polymer was prepared by reacting urea, ammonia and formaldehyde as described earlier, and then reacting further with two moles of formaldehyde per mole of the urea, to produce the methylolated cyclic urea prepolymer having a 50% solids level.

A) Resin A:

The cyclic urea prepolymer was reacted with a standard phenol-formaldehyde resin during the cook cycle of the

TABLE 1

| Binder | Grams Resin | Grams Premix | Grams 40% urea | Grams Water | Grams 28% NH$_4$OH | Grams 20% (NH$_4$)$_2$SO$_4$ | Grams UFA Resin |
| --- | --- | --- | --- | --- | --- | --- | --- |
| 1 | 0 | 42.0 | 0 | 49.7 | 3.8 | 4.5 | 0 |
| 2 | 29.0 | 0 | 13.0 | 49.7 | 3.9 | 4.5 | 0 |
| 3 | 29.0 | 0 | 0 | 51.8 | 3.8 | 4.5 | 10.9 |
| 4 | 29.0 | 0 | 0 | 52.5 | 3.8 | 4.5 | 10.2 |
| 5 | 19.6 | 0 | 0 | 53.7 | 2.6 | 3.3 | 20.9 |
| 6 | 19.6 | 0 | 0 | 55.0 | 2.6 | 3.3 | 19.6 | phenol-formaldehyde resin. Phenol (1311 g) was combined with 583 g of formaldehyde (50%), 1217 g of water, 500 g of cyclic urea prepolymer, 16 g of pearl starch, 1.5 g defoamer, and 158 g of caustic (50%). The initial loading of phenol and formaldehyde was adjusted to maintain a mole ratio of 0.8 F/P during the first cook stage. The mixture was allowed to exotherm to 79–80° C. with heat. Additional caustic (142 g, 50%) was added and then 1033 g of formaldehyde (50%) was added over 30 minutes. The mixture was allowed to exotherm to 97–98° C. with heat. The mixture was held for 22 minutes before cooling to room temperature. The cyclic urea prepolymer comprised 9.5 wt % of the final resin.

The viscosity of the final resin was 944 cps at 25° C., solids content was 43.6 wt %, percent caustic was 5.9 wt %, gel time was 25.7 minutes, refractive index of 1.4643 and molecular weight was Mn=279 Mw=693 and Mz=1407. The polydispersity was 2.482.

A standard plywood resin was used as the control resin and had a viscosity of 1146 cps, solids content of 44 wt %, percent caustic of 5.9 wt %, gel time of 24 minutes, refractive index of 1.4646 and molecular weight by GPC of Mn=318, Mw=948, and Mz=2322.

B) Six Adhesive Mixes were Made.

The control adhesive mix contained 1) fresh water at 17.5 wt %, 2) Q-bond corn flour extender at 6.6 wt %, 3) Co-Cob filler (furfural residue made from waste agricultural sources) at 7.6 wt %, 4) soda ash at 0.3 wt %, 5) 50% caustic at 3.0 wt % and 6) phenol-formaldehyde resin at 65 wt %. Only the standard plywood resin formed part of the control adhesive mix. The remaining mixes replaced all or part of the standard plywood control resin with Resin A.

Mix #1 The standard plywood control resin.

Mix #2 50/50 wt. ratio of the standard plywood control resin and Resin A.

Mix #3 100% of Resin A.

Mix #4 Mixture of 38 g of Resin A and 743 g of the standard plywood control resin.

Mix #5 Mixture of 75 g of Resin A and 706 g of the standard plywood control resin.

Mix #6 Mixture of 154 g of Resin A and 635 g of the standard plywood control resin.

After the adhesive mixes were made, the cyclic urea prepolymer content in mixes 4, 5 and 6 was increased. Methylolated cyclic urea pre-polymer (35 g) was added to mix 4, 67 g to mix 5 and 137 g to mix 6. Modifications to the formulation were made for the addition of cyclic urea prepolyrner which was not cooked into the resin by adjusting the solids contributed by the PF resin, filler and extenders. Those changes are presented in the Table 3 in terms of total dry solids, total resin solids and PF resin solids.

TABLE 3

| Mix # | 1 | 2 | 3 | 4 | 5 | 6 |
|---|---|---|---|---|---|---|
| Total Dry Solids, % | 42.5 | 42.6 | 42.9 | 42.7 | 42.9 | 43.4 |
| Total Resin Solids, % | 28 | 28.2 | 28.4 | 28.7 | 29.2 | 30.5 |
| Total PF Resin Solids, % | 28 | 26.7 | 25.3 | 27.1 | 26.3 | 24.9 |
| Total Cyclic Urea Solids, % | 0 | 1.5 | 3.1 | 1.6 | 2.9 | 5.6 |
| % Cyclic Urea Solids, Cooked | 0 | 1.5 | 3.1 | 0.2 | 0.3 | 0.5 |
| % Cyclic Urea Solids, Added | 0 | 0 | 0 | 1.4 | 2.6 | 5.1 |
| % Cyclic Urea, 100% Resin Basis | 0 | 5.5 | 10.8 | 5.4 | 9.9 | 18.3 |
| % Wood Failure | 64.5 | 78.8 | 70.1 | 83.3 | 83.5 | 53.5 |

The adhesive mixes were applied to southern pine veneers of ⅛ inch thickness and evaluated in three ply panels made on a hot press. The veneers were stabilized to a 8% moisture content and used as all the plies in a three ply plywood panel lay-up. The adhesives were applied by a laboratory spreader at a spread rate of 31 to 33 grams per sq. ft. per double glue line. The assemblies were set aside in a closed configuration for 15 minutes before pre-pressing at 150 psi for 4 minutes. After pre-pressing the panels were hot pressed at 157° C., 175 psi for 3 minutes and stacked in a hot box overnight before cutting test specimens. Four panels were pressed for each adhesive mix. APA type test specimens were cut. After subjecting the test specimens to the APA vacuum-pressure soak cycle, the specimens were tested while wet by tension loading to failure in a shear testing machine. The percent wood failure for each test specimen was determined and recorded after the test specimens were dried. The average percent wood failure is presented in the above table.

The cyclic urea prepolymer either cooked into the resin or added to a plywood resin was found to yield acceptable bonding performance when formulated into an adhesive and applied to veneers in typical plywood construction. The amount of cyclic urea solids by weight in the adhesive based upon the total resin solids by weight was varied between 0 and 18.3% in the constructions evaluated. Percent wood failures in many were better than the average wood failure percent of the standard control resin and adhesive.

Example 4

Phenol-formaldehyde Resins Modified with Cyclic Urea Prepolyrner and Use in Lamainates The following Table 4 provides four phenol-formaldehyde resins prepared for evaluation with the cyclic urea prepolymer (extender).

TABLE 4

|  | A | B | C | D |
|---|---|---|---|---|
| Phenol | 2000 | 2110 | 1944 | 1724 |
| 50% Formaldehyde Solution | 1793 | 2317 | 2384 | 2769 |
| 50% Sodium Hydroxide Solution | 25 | 73 | 67 | 60 |
| Urea | 50 | 42 | 39 | 35 |
| Distillate | −786 | −890 | −1031 | −1225 |
| Methanol | 466 | 420 | 450 | 450 |
| 18% Hydrochloric Acid | 20 | 0 | 0 | 0 |
| Yield | 3568 | 4073 | 3853 | 3811 |
| Cook Temperature (° C.) | 92 | 82 | 82 | 82 |
| Cook Time (min) | 105 | 175 | 155 | 152 |
| % Solids | 66.0 | 68.8 | 69.7 | 69.5 |
| Viscosity (cps) | 220 | 405 | 540 | 730 |
| % Water Content | 10.5 | 10.1 | 10.5 | 9.8 |
| pH | 7.5 | 8.6 | 8.6 | 8.5 |
| % Free Phenol | 8.0 | 3.9 | 2.5 | 1.0 |

Phenol and 50% formaldehyde were loaded into a 5 liter lab reactor equipped with a reflux condenser and a vacuum system. 50% sodium hydroxide catalyst was loaded. The mixture was heated to the cook temperature at approx. 1° C./min rate. The mixture was cooked at that cook temperature for the specified time. Vacuum was applied and the mixture was cooled to 50° C. Urea was loaded. The mixture was distilled at 50° C. to an end point that allowed the water content of the final resin to be achieved. Methanol was loaded. The pH was adjusted with 18% hydrochloric acid as necessary.

Resin A was a typical resin (control) used in the laminating industry. Resins B–D are higher formaldehyde to phenol (F:P) mole ratio resins that typically can not be used to produce good quality laminates because they cure too fast to a higher degree of cure. One test to measure cure rate (and degree of cure) is called the "Stroke Cure Test." A small sample (½ cc) of resin is applied to a hot plate held at a constant temperature. It is stoked with a small laboratory type spatula to a specified end point. In the samples, the hot plate was maintained at a temperature of 155° C. and the end point was the "disappearance of strings" when the sample was stroked with the spatula.

The following samples (Table 5) show the effect of the addition of the cyclic urea prepolymer extender on stroke cure:

TABLE 5

| Sample | Resin | % UF | Stroke Cure (sec) |
|---|---|---|---|
| a | A | 0 | 53 |
| b | A | 5 | 58 |
| c | A | 10 | 79 |
| d | A | 20 | 83 |
| e | A | 40 | 103 |
| f | B | 0 | 45 |
| g | B | 10 | 45 |
| h | B | 40 | 55 |
| i | C | 0 | 36 |
| j | C | 10 | 39 |
| k | C | 40 | 49 |
| l | D | 0 | 33 |
| m | D | 10 | 37 |
| n | D | 40 | 43 |

The pH of the neat phenol-formaldehyde resin also has an effect the stroke cure results. In the following samples (Table 6), the resin pH was adjusted with 18% hydrochloric acid. The effects on Stroke Cure are shown:

TABLE 6

| Sample | Resin | pH | % UF | Stroke Cure (sec) |
|---|---|---|---|---|
| o | B 100% | 7.5 | 0 | 51 |
| p | B 90% | 7.5 | 10 | 55 |
| q | B 60% | 7.5 | 40 | 70 |
| r | B 100% | 6.5 | 0 | 65 |
| s | B 90% | 6.5 | 10 | 61 |
| t | B 60% | 6.5 | 40 | 85 |
| u | C 100% | 7.0 | 0 | 53 |
| v | C 90% | 7.0 | 10 | 53 |
| w | C 60% | 7.0 | 40 | 64 |

In some cases the Stroke Cure did not change much at the low, 10% level of cyclic urea prepolymer while at the higher levels the effects are significant, especially when used in combination with pH.

The major benefit is the allowance of higher F:P mole ratio phenol-formaldehyde resins to be utilized to manufacture laminates without the drawback of fast Stroke Cures leading to increased degree of cure and brittleness of the laminates. Additional benefits are reduced free phenol levels in the base resin as well as still lower levels in the combined PF/cyclic urea prepolymer system (due to dilution).

Example 5

Preparation of Phenol-Formaldehyde Abrasive Binders

A standard phenol-formaldehyde abrasive binder (2515 g) was heated to 55° C. Cyclic urea prepolymer (252 g–10% of total mixture) was added. The temperature was held at 55° C. for 30 minutes and then cooled to room temperature. The process was repeated with 1475 g standard phenol-formaldehyde abrasive binder and 118 g (20% of total mixture) cyclic urea prepolymer.

TABLE 7

| Properties | Initial Resin | Resin with 10% cyclic urea prepolymer | Resin with 20% cyclic urea prepolymer |
|---|---|---|---|
| % Non Volatile | 55.3 | 54.1 | 54.4 |
| Brookfield Viscosity, cps | 140 | 144 | 170 |
| % Free HCHO | 0.48 | 0.37 | 0.40 |
| % Free Phenol | 0.84 | 0.70 | 0.79 |
| 121° C. Gel Time (min.) | 11.9 | 12.2 | 13.4 |
| 150° C. Hot Plate Cure Time (sec.) | 34 | 36 | 35 |
| Water Durability | 1800 | 700 | 485 |

Example 6

Preparation of Novolac Coated Foundry Sand Binder

Two sand preparations were prepared. In each, 3000 g of sand was heated to 175° C. Then 105 g of standard foundry phenol-formaldehyde resin flake was added and mixed for one minute. Then 15.8 g of hexamine and 75 ml $H_2O$ or 22 g of cyclic urea prepolymer and 75 ml $H_2O$, was added and the mixture was mixed until doughy. Cooling air was added until a free flowing sand mixture was obtained.

TABLE 8

| Properties | Hexamine | Cyclic Urea Prepolymer |
|---|---|---|
| Melting Point | 90° C. | 93° C. |
| 3' Hot Tensile | 200–210 psi | 30–40 psi |
| 3' Cold Tensile | 400–410 psi | 360–370 psi |

The cyclic urea prepolyrner sand is free flowing without sticking together which is similar to hexamine. The hot tensile is low, but can be raised with a suitable cure accelerator.

Example 7

Preparation of Phenol-formaldehyde Resin and Use in Oriented Strand Board (OSB)

A modified cyclic urea prepolymer (Mod-CUP) was prepared with 73.5% cyclic urea prepolymer and 23% formaldehyde (50% solution). The pH was adjusted to 9.5 with 0.5% NaOH (50%). The mixture was heated to 90° C., held for 30 minutes and then cooled to 25° C. Phenol-formaldehyde resins were then prepared as follows (Table 9):

TABLE 9

| Cyclic Urea: | 10% (percent) | 20% (percent) |
|---|---|---|
| 1. Phenol | 23.0 | 21.3 |
| 2. Water | 21.6 | 16.6 |
| 3. NaOH (50%) | 2.9 | 2.9 |
| 4. H2CO (50%) | 34.4 | 31.1 |
| 5. NaOH (50%) | 8.1 | 8.1 |
| 6. Mod-CUP | 10.0 | 20.0 |

Phenol and Mod-CUP were combined. Water and first addition of caustic were added and the mixture was heated to 49° C. Formaldehyde was added over a 30 minute period maintaining the temperature below 85° C. The mixture was allowed to exotherm. After exotherm was complete, the mixture was heated to 90° C. and reacted to a Gardner Holt viscosity of B to C. The mixture was then cooled to 75° C. and the reaction was continued to a Gardner Holt viscosity of R. A second addition of caustic was added while the temperature was maintained at 76° C. The mixture was cooled to 63° C. and the reaction was continued to a Gardner Holt viscosity of J to K. The mixture was then cooled 25° C.

Panels were prepared using sweet gum furnish at a mat moisture content of 6.3–6.5%. The panel manufacturing conditions were as follows (Table 10):

TABLE 10

| Furnish | Sweet gum |
|---|---|
| Dimensions | 16 × 16 × 7/16 inches |
| Wax | 1% on OD wood |
| Resin | 2% on OD wood |
| Press Temperature | 400° F. |
| Press Time | Fifteen second series |
| Mat Moisture | 6.3–6.5% |
| Target Density | 43 pcf |

Panels were tested for internal bond strength (IB) and boiled internal bond strength (BIB). Results are shown below. Powder properties are in Table II.

The board surfaces of the set made with 10% cyclic urea were the tightest after the 2-hour boil/dry cycle, followed by the control and the 20% level. Addition of cyclic urea at the 10% level did not appear to have a significant impact on IB/BIB, with the exception of IB at the longest press time. The boards made with 20% cyclic urea were not durable and exhibited lower IB values.

TABLE 11

Panel Testing Results

| Resin | Average Panel Density (pcf) | IB (BIB) at Press Time: 3.25 (mins.) | 3.50 (mins.) | 3.75 (mins.) |
|---|---|---|---|---|
| Control | 41.9 | 40.3 (2.7) | 42.6 (3.7) | 55.2 (7.0) |
| 10% cyclic urea | 42.6 | 41.3 (1.6) | 36.5 (2.2) | 43.5 (5.0) |
| 20% cyclic urea | 42.9 | 35.4 (0.6) | 26.8 (0.1) | 46.1 (0.1) |

TABLE 12

Powder Properties

| Powder | Stroke Cure (secs.) | Fusion Diameter (mm) | Moisture (%) | Bulk Density (pcf) |
|---|---|---|---|---|
| Control | 13 | 41.7 | 2.58 | 31.7 |
| 10% cyclic urea | 13 | 39.8 | 2.42 | 28.3 |
| 20% cyclic urea | 17 | 40.3 | 2.77 | 30.5 |

Example 8

Preparation of Melamine-Formaldehyde Resins and Combination with Clay

Melamine (26 parts) was reacted with formaldehyde (28 parts, 50% solution) in the presence of caustic soda catalyst (0.1 part, 500% solution) and 5.9 parts water. The mixture had a pH 9.2 and was heated at 90° C. until it turned water-clear. Then, 40 parts of cyclic urea (50% solution) was added and heated further until the resin was insoluble in an ice-water mixture. The mixture was cooled to 80° C. and reacted further until the water tolerance was 1.8 parts water to 1.0 part resin at 25° C. (the resin turns cloudy when the indicated ratio of water is mixed at 25° C.). Then, the resin was cooled and the final pH was adjusted to 10.

Resin-clay coating mixes were prepared with 4 parts clay and 1 part resin in a 55% solids aqueous mixture. These mixes were then catalyzed with the appropriate amount of ammonium sulfate to yield the catalyzed resin-clay slurries. Dynamic mechanical analysis (DMA) cure data for the resin-clay mixes and corresponding cured moduli are listed in Table 13.

TABLE 13

DMA Results for a Series of UFP-Extended MF Resin-Clay (4:1 ratio) Mixes

| % UP | Cure Time @ 140° C., min | Cured Modulus @ 140° C., Kpsi |
|---|---|---|
| 0 | 4.3 | 1267 |
| 10 | 4.9 | 1210 |
| 10* | 3.2 | 1290 |

All resins were 60% solid and had an F:M = 1.7.
*F:M = 2.0

Thermal analysis results are listed in Table 14 for each resin-clay coating mix. The thermogravameteric analysis (TGA) samples were catalyzed with the appropriate amount of a lactic acid solution to produce a fully cured material and heated to 200° C. at a 10° C. per minute heating rate.

TABLE 14

TGA Data for a Series of Cured Resins

| Resin Type | F/M | % Prepolymer Solids | % Wt loss from 25–200° C. |
|---|---|---|---|
| MF | 2.2 | 20 | 2.64 |
| MF | 2.2 | 0 | 3.73 |
| UF | — | 0 | 5.94 |
| UP Solution | — | 50 | 6.08 |

All resins were 60% solid and had an F:M = 2.2.

Example 9

Preparation of Melamine-Formaldehyde Resins

A melamine-formaldehyde resin was prepared by reacting 24 parts melamine crystal with 25 parts formaldehyde (50% solution) in the presence of 0.1 part caustic soda catalyst (50% solution) 3.7 parts sugar, and 7.1 parts water. The mixture had a pH 9.2 and was heated at 90° C. until it turned water-clear. Then, 40 parts of the cyclic urea prepolymer (50% solution) was added and heated further until the resin was insoluble in an ice-water mixture. The mixture was cooled to 80° C. and reacted further until the water tolerance was 1.8 parts water to 1 part resin at 25° C. (the resin turns cloudy when the indicated ratio of water is mixed at 25° C.). The resin was cooled, the final pH was adjusted to 10. Then, 4.5 parts of diethylene glycol and 3 parts water were cold blended into the resin.

Example 10

Use of Melamine-Formaldehyde Resins in Overlay Paper Laminates

1) Preparation of Laminates:
Decorative sheets (blueberry pattern, basis weight 90 g/m²) were treated with the various resins to 52% resin and 7% volatile contents. The sheets were pressed onto 4"×4" particle board substrates 163° C./300 psi for varying press times.

2) HCl Test for Degree of Cure of the Melamine Laminate Surface:

The cure rate of a series of low pressure laminates was determined by exposing the surface of the laminate to 2–3 drops of 4 N HCl covered with a micro cover glass for 20 minutes. Exactly after 20 minutes of contact, the cover was removed and the surface wiped with a wet tissue followed by a dry tissue. The area was allowed to dry for 5 minutes, and then, the surface conditions were evaluated based on the following scale:

HCl Test Scale

1- No effect to very slight effect (over-cured)
2- Very slight loss of surface gloss (slightly over-cured)
3- Moderate loss of gloss without obvious exposure of paper fibers (properly cured)
3.5- Further loss of gloss without obvious exposure of paper fibers
4- Apparent loss of gloss with moderate exposure of paper fibers (under-cured)
5- Badly attached surface with excessive swelling of paper fibers (very under-cured)

3) Steam Test for Degree of Cure of Melamine Laminate Surface:

The surface of the LP Laminate series was exposed to direct steam for a controlled time to determine the degree of cure. The appearance of a white area after exposure to steam was evidence of an under-cured surface.

4) Crack Resistance Test of Melamine Panel Surface (LPL):

The crack resistance of the series of low pressure laminates was determined by placing the laminates in a chamber at 20% RH and 25° C. for 3 weeks. The number of days the Laminate resists cracking is recorded with a description of the cracked surface, i.e., number, type, and size of cracks.

The ability to incorporate cyclic urea prepolymer into melamine-formaldehyde resins was investigated by cold blending 4.2% diethylene glycol (DEG) into ME resins prepared in accordance with Example 6 to form Resins A and B. Both resins had a F:M of 2.2; however, Resin A contained 5% cyclic urea prepolymer while Resin B contained 20% of the final 60% solid resin. The physical properties of the two blends were compared to that of a control resin. (Table 14)

The control resin was prepared in the same manner as Resins A and B but without the addition of cyclic urea prepolymer. Melamine (37.4 parts melamine crystal) was reacted with formaldehyde (30.3 parts, 50% solution) in the presence of caustic soda catalyst (0.01 part, 50% solution), 4.2 parts DEG, 3.2 parts sugar, and 24.9 parts water. The mixture had a pH of 9.2 and was heated at 95° C. until it turned water-clear and was insoluble in an ice-water mixture. Then, it was cooled to 85° C. and reacted further until the water tolerance was 1.8 parts water to 1.0 part resin at 25° C. (The resin turns cloudy when the indicated ratio of water is mixed at 25° C.) Then, the resin was cooled and the final pH adjusted to 10.

The properties of the two blends were very similar to the control resin except for gel times. The catalyzed gel time increased with increasing % cyclic urea prepolymer extension. Comparable cure speeds were established by increasing the catalyst level to 3% and 4.5% for Resins A and B, respectively. In addition, the water tolerances for the various resins were different due to the age of the samples.

TABLE 15

| Final Properties | Control | Resin A | Resin B |
|---|---|---|---|
| Appearance | clear | clear | clear |
| RI | 1.4866 | 1.4767 | 1.4706 |
| pH @ 25° C. | 10.0 | 9.7 | 9.7 |
| viscosity, cP | 39.4 | 67.5 | 57.9 |
| % Solids; 105° C. for 3 h | 60.8 | 58.7 | 57.5 |
| 135° C. Catalyzed Gel Time | | | |
| 1.6% Cycat 4045 | 4.5 min | 8.03 min | 12.55 min |
| 3.0% Cycat 4045 | — | 4.88 min | — |
| 4.5% Cycat 4045 | — | — | 4.89 min |
| H$_2$O Tolerance @ 25° C. | 180% | 86% | 104% |

The laminates were exposed to 1 drop of 4N HCl for 20 min in order to determine the minimum cure conditions. The results are reported in Table 16. Based on the 4N HCl cure test, both Resins A and B have a comparable cure behavior to the control. The cure conditions were also probed by exposing the LP laminates to steam for a controlled time. Under these conditions, samples pressed for 0.5 min failed the 4 and 8 min exposure tests. However, all other samples (press times ≧ 2 minutes) passed the steam test for at least 8 min regardless of resin composition.

TABLE 16

Minimum cure determined by steam and HCl tests

| Resin | F/M | % Prepolymer Solids | Steam Exposure Time | Sample Press Time @ 325° F./300 psi | | |
|---|---|---|---|---|---|---|
| | | | | 0.5 min | 2 min | 5 min |
| Control | 1.7 | 0 | 2 min | P | P | P |
| | | | 4 min | F | P | P |
| | | | 8 min | F | P | P |
| | | | (HCl Test) | 3.5 | 3 | 2 |
| Resin A | 2.2 | 5 | 2 min | P | P | P |
| | | | 4 min | F | P | P |
| | | | 8 min | F | P | P |
| | | | (HCl Test) | 3.5 | 3 | 2 |
| Resin B | 2.2 | 10 | 2 min | P | P | P |
| | | | 4 min | F | P | P |
| | | | 8 min | F | P | P |
| | | | (HCl Test) | 3.5 | 3 | 2 |

P = pass  F = fail

An additional test for surface crack resistance of each panel was also performed by exposing the laminates to 20% RH at room temperature. After 21 days of exposure, all LP Laminate panels remained crack free.

It will be understood that while the invention has been described in conjunction with specific embodiments thereon the foregoing description and examples are intended to illustrate, but not limit the scope of the invention. Other aspects, advantages and modifications will be apparent to those skilled in the art to which the invention pertains, and these aspects and modifications are within the scope of the invention, which is limited only by the appended claims.

What is claimed is:

1. A laminate comprising a paper substrate and a binder comprising a phenol-formaldehyde resin or a melamine-formaldehyde resin modified with 1 to 95 wt % based on resin solids of a cyclic urea prepolymer either during manufacture of the resin or post added to the resin wherein the cyclic urea prepolymer has a mole ratio of urea:formaldehyde:ammonia or a primary amine of about 0.1 to 1.0:0.1 to 3.0:0.1 to 1.0.

2. A laminate according to claim 1 wherein the laminate is an overlay paper laminate comprising the paper substrate and a coating comprising the binder, wherein the resin is a melamine-formaldehyde resin.

3. The laminate according to claim 1 wherein the resin is a phenol-formaldehyde resin.

4. The laminate according to claim 3 wherein the resin is a high pressure laminating resin.

* * * * *

UNITED STATES PATENT AND TRADEMARK OFFICE
CERTIFICATE OF CORRECTION

PATENT NO. : 6,245,438
DATED : June 12, 2000
INVENTOR(S) : F.C. Dupre et al.

It is certified that error appears in the above-identified patent and that said Letters Patent is hereby corrected as shown below:

<u>Title page,</u>
Item [57] ABSTRACT, line 8, after "manufacturer" -- of -- has been inserted.

<u>Column 5,</u>
Line 45, "prepolyrner" has been replaced with -- prepolymer --.

<u>Column 7,</u>
Line 3, after "35.2" -- % -- has been inserted,
Line 46, after "solution" -- . -- has been inserted, <u>Column 10,</u>
Line 52, "400-600 F" has been replaced with -- 400-600° F --.

<u>Column 20,</u>
Line 29,"prepolyrner" has been replaced with -- Prepolymer --, and
"Lamainates" has been replaced with -- Laminates --.

<u>Column 22,</u>
Line 37, "prepolyrner" has been replaced with -- prepolymer --.

Signed and Sealed this

Fifteenth Day of January, 2002

*Attest:*

JAMES E. ROGAN
*Attesting Officer*     *Director of the United States Patent and Trademark Office*